United States Patent Office 3,159,025
Patented Dec. 1, 1964

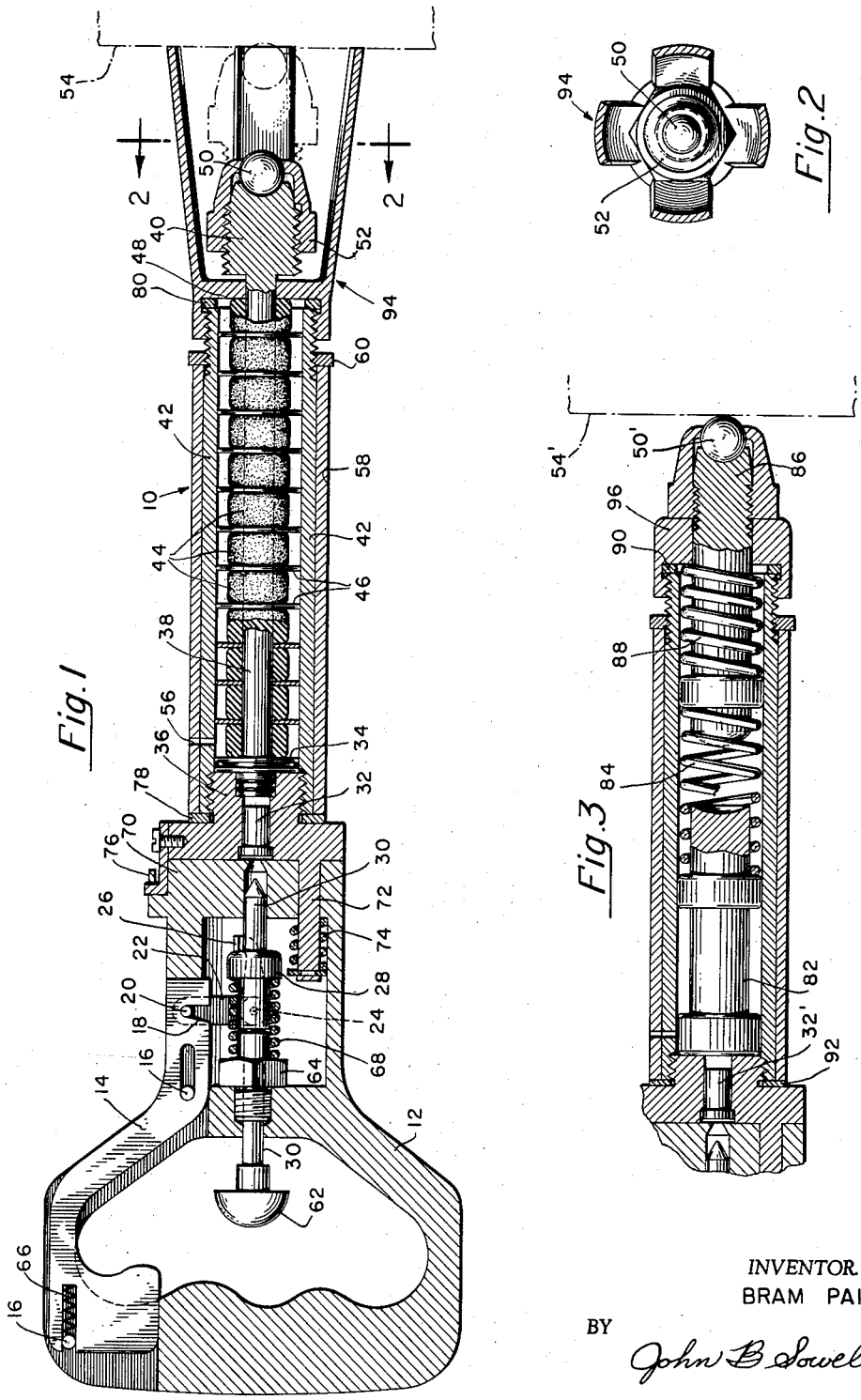

3,159,025
EXPLOSIVE ACTUATED HARDNESS TESTER
Bram Pais, Grosse Pointe Park, Mich., assignor to The Budd Company, Philadelphia, Pa., a corporation of Pennsylvania
Filed July 17, 1962, Ser. No. 210,390
8 Claims. (Cl. 73—82)

This invention relates to a hardness testing device and more particularly to a portable impact hardness tester actuated by blank cartridges.

Hardness testing is usually performed by large expensive, non-portable testing machines. Heretofore, there were no self-actuating portable hardness testing devices which had the accuracy of the larger expensive testing machines. With these large machines it was extremely difficult or impossible to perform hardness tests on pieces of equipment that could not be dismantled and placed into the large non-portable testing machine. Even if the testing machine was small enough to be made portable it was difficult or near impossible to test a piece of equipment in an overhead or awkward position especially if the piece to be tested presented only a curved surface.

Therefore, it is a primary object of the present invention to provide a new and improved portable, self-actuated hardness tester;

It is a general object of the present invention to provide a light weight, inexpensive precision, portable, impact hardness tester;

It is another object of the present invention to provide an impact hardness tester actuated by blank cartridges;

It is another object of the present invention to provide an impact hardness tester which may be actuated from any horizontal or vertical position;

It is a further object of the present invention to provide a portable impact hardness tester provided with an adjustable precision calibration therein;

It is a more specific object to provide an improved impact hardness tester having two separate captive pistons slidably and adjustably mounted in a barrel assembly with calibrated spring tension means to provide adjustable calibration of the testing device.

Hardness testers constructed in accordance with the invention are lighter, cheaper and more reliable than portable testers made heretofore, and may in general comprise, a rear housing having connected thereto handle means and firing means, a firing chamber abutting the firing means, a barrel assembly connected to the firing chamber, a driving piston slidably mounted in said barrel, a driven piston having a test ball point operated by said driving piston, spring tension means urging said driving piston against said firing chamber, cartridge firing means housed in said firing chamber for causing said driving piston to compress said spring tension means and thereby urge said driven piston and said test ball point against a test object with a predetermined impact force, and includes means for adjusting the acceleration stroke of the driving piston to set or calibrate the impact force to be imparted to the test ball.

Other features and objects of the invention will be found throughout the more detailed description of the invention which follows. Those novel features believed descriptive of the nature of the invention are described with particularity in the appended claims. To more clearly portray the invention and its manner of operation the description is supplemented with the accompanying drawings:

FIG. 1 is a cross-section in elevation of a simplified embodiment of the present invention;

FIG. 2 is a section in elevation taken at lines 2—2 of FIG. 1 showing an end view of the test ball point;

FIG. 3 is a partial section in elevation of a preferred embodiment of the invention shown in FIG. 1.

Referring now to FIG. 1 showing a hardness tester 10 in cross-sectional elevation. A handle assembly 12 provides a mounting structure for a spring biased trigger 14 slidably mounted on pins 16. A notch 18 in the trigger 14 engages a pin 20 on bell crank lever 22. Lever 22 is pivoted in the side of the handle assembly 12 at point 24 so that rearward movement of the trigger 14 causes rearward movement of the pin 20 rocking bell crank lever 22 and raising the sear catch 26 to release the hammer 28 and firing pin 30 which strikes cartridge 32 initiating the blank charged therein. The expanding gases of the blank cartridge 32 forces driving piston 34 forward out of engagement with the firing chamber 36. Driving piston 34 may be connected to piston operating rod 38 which is connected at its other end to a driven piston 40 and constitutes a part of the driven element. Driving piston 34 and operating rod 38 are retained in the barrel assembly 42 by means of resilient cushion devices 44 separated by baffles 46 to provide a compressible structure therebetween. When the cartridge 32 is fired it causes driving piston 34 to exert a force through the cushion means to the end guard 48. Since the cushion devices are restrained and selected to be of an incompressible material they tend to occupy the same volume between baffles as the baffles are forced closer together thus retaining the driving piston in the barrel assembly. The size, shape and material of the resilient cushion devices 44 are selected so that the driven piston 40, test ball 50 and ball retainer 52 are moved from the firing position into engagement with the specimen or testpiece 54. The test ball 50 illustrated in the simplified embodiment is a 10 millimeter diameter tungsten carbide Brinell hardness ball having a hardness value of 630 B.H.N. designed for a test load of 3000 kg.

After a cartridge 32 has been fired the driven piston moves forward during its acceleration stroke to a point along the barrel assembly 42 when gas ports 56 are uncovered permitting the discharge of the expanding gases through the gas ports in the barrel assembly 42 and barrel insulation 58. Driving piston 34 continues its acceleration stroke until the kinetic energy imparted to the driven piston is first imparted to the test ball as a predetermined impact force. Barrel insulation 58 may be of molded plastic and provided with a shroud (not shown) surrounding the gas ports. Barrel insulation 58 is a slip fit over barrel assembly 42 and is held in place by locking collar 60. After gas ports 56 are uncovered and driving piston 34 subsequently ends its predetermined acceleration stroke during forward travel, resilient cushion device 44 returns the driving piston to its normal operating or firing position in engagement with the firing chamber 36. Sear catch 26 is then resting on the collar of hammer 28. To retract the firing pin 30 it is only necessary to grasp the knob 62 which is fitted to the rearward extending end of firing pin 30. In the simplified device firing pin 30 extends from the knob 62 through the guide bushing 64 and through the hammer 28 which is connected thereto. If the knob 62 is pulled rearward until the sear 26 is free to fall in front of the collar of hammer 28 the spring 66 will force spring biased trigger 14 against pin 20 thus rocking bell crank arm 22 clockwise to position sear 26 in front of the hammer 28 thus maintaining hammer 28 and firing pin 30 in a cocked or spring tensioned position by means of spring 68.

The breach block 70 illustrated is of the pivoting eccentric type. Breech block 70, shown here as an integral part of the handle assembly 12 is pivoted on a pin 72 connected to the firing chamber 36. Breech block 70 is urged into sliding engagement with the rear face of the firing chamber by spring means 74. In the firing position the firing chamber 36 and breech block 70 are held in critical alignment and contact by locking means 76. It will be understood that breech block 70 and firing chamber 36 are locked securely in abutting relationship by interfitted cam and groove means, not shown. Conventional ejection means, not shown, are provided in breech block 70 to engage the rim of cartridge 32.

A feature of the portable tester permits field calibration and adjustment of the instrument. For example, the amount of travel of the driving piston 34 prior to the impact force being exerted on the Brinell ball is determinative of the force exerted thereon. The distance traveled by piston 34 prior to uncovering gas ports 56 is adjustable by shims 78 intermediate the firing chamber and the barrel. Also the amount of travel of the test ball 50 before striking the testpiece 54 may be varied by shims 80. Shim 80 permits changing the acceleration stroke of the driving piston. The acceleration stroke may be modified further by shortening the barrel 42 and/or changing several of the cushions 44. The latter adjustment is usually carried out by the manufacturer while the former adjustments are carried out in the field to compensate for wear and to adjust the impact force.

FIG. 3 is a preferred embodiment of the invention shown in FIG. 1, and differs therefrom principally in that the structure permits the test ball 50' to be placed directly against specimen 54' and the hardness tester actuated with the ball touching the specimen. Two separate and independent pistons are provided which permits easier adjustment of the acceleration stroke and impact force. Driving piston 82 is actuated by cartridge 32' to compress spring 84 and impact upon driven piston 86 which is retained in its normally rearward position by spring 88.

The tension in spring 88 may be varied by setting the spring 88 or replacing the spring 88. For minor adjustments shims 90 may be employed. In like manner the amount of impact imparted to piston 86 may be adjusted by modifying spring 84 or employing shims 92 as explained hereinbefore as regards shims 78.

In both embodiments of the hardness tester the identical handle firing chamber and barrel may be employed. The only modification necessary is to remove pistons 34 and 40, guard 94 and the accessory springs therebetween and substitute pistons 82 and 86, guard 96 and the accessory springs therebetween.

It will be noted in the embodiment of FIG. 1 the test ball is moving upon impact and in the modified embodiment the test ball 50' is held in contact with the test specimen 54'. It has been found necessary to employ a calibrating microscope similar to the well known Brinell microscope to measure the penetration of the test ball. It was found that the impact hardness tester described hereinbefore required a set of calibrated tables to interpret the correct Brinell hardness number from the impression observed with a standard Brinell microscope, but the microscope may be adjustably calibrated to read directly the hardness of specimens by adjusting the indicated reading of the microscope to a known value after operating the tester on a test specimen of known Brinell hardness. Such a method of testing relieves to a large degree the requirement for extremely accurate calibration of the impact hardness tester.

Several different calibrated cartridges may be employed to insure more accurate impression readings. It is intended that power actuated tools such as stud drivers may be adapted as impact testing devices by employing the novel portion of the present device shown in FIG. 3.

In order to calibrate the present device it is only necessary to know the hardness of a single testpiece and adjust the shims and springs of the novel device until a correct impression is observed for the hardness of the known testpiece. While a preferred embodiment has been shown and a single modification illustrated, other changes and modifications may be made without departing from the scope of the invention, some of the novel features of which are defined in the appended claims.

What is claimed is:

1. In an explosive charge actuated apparatus for testing the hardness of a test specimen by exerting a predetermined impact force on a Brinell ball in contact with said test specimen, the combination comprising:
   (A) a barrel assembly having a center bore, a muzzle end, and a breech end;
   (B) an end guard connected to the muzzle end of said barrel assembly, said end guard having a guide bore aligned with said center bore;
   (C) a firing chamber assembly connected to the breech end of said barrel assembly, said firing chamber assembly having a recessed firing chamber therein adapted to receive an explosive cartridge;
   (D) a breech assembly mounted on said firing assembly and adapted to close the breech end of said explosive cartridge in said firing chamber;
   (E) a firing pin mechanism slidably mounted in said breech mechanism and adapted to explode said explosive cartridge in said firing chamber;
   (F) a driving piston slidably disposed in said barrel assembly to form a seal between said driving piston and said firing chamber, said driving piston being adapted to be accelerated by the exploding cartridge over an adjustable acceleration stroke so as to develop a desired velocity indicative of a predetermined impact force;
   (G) a driven piston slidably mounted in said guide bore and having a driven end adapted to be driven by said driving piston and a test end extending beyond said muzzle end;
   (H) a Brinell hardness ball mounted on said test end of said driven piston and adapted to receive a predetermined impact force therefrom; said impact force being defined as the kinetic energy transferred from said driven piston to said Brinell hardness ball at the end of said adjustable acceleration stroke of said driving piston;
   (I) and means for adjusting the length of said acceleration stroke of said driving piston so as to achieve a predetermined calibrated velocity indicative of a predetermined calibrated impact force imparted by said Brinell hardness ball to the surface of said specimen to be tested.

2. An exposive hardness testing apparatus as set forth in claim 1 wherein there is further provided resilient means yieldingly exerting a force on said pistons toward said breech end of said barrel assembly to position said pistons in a normal firing position in said barrel assembly.

3. An explosive actuated hardness testing apparatus as set forth in claim 1 which further includes an exhaust gas port uncovered by said driving piston during said acceleration stroke to greatly reduce the pressure exerted on said driving piston by said exploding cartridge, thus providing a high pressure portion of said acceleration stroke and a low pressure portion of said acceleration stroke.

4. An explosive actuated hardness testing apparatus as set forth in claim 3 wherein said means for adjusting the length of said acceleration stroke includes spacer means intermediate said barrel assembly and said firing chamber, the addition of said spacer means having the effect of increasing said acceleration stroke of said driving piston.

5. An exposive actuated hardness testing apparatus as set forth in claim 4 wherein said spacer means intermediate said barrel assembly and said firing chamber provide means for adjusting the length of said high pressure portion of said acceleration stroke.

6. An exposive actuated hardness testing apparatus as set forth in claim 2 wherein said means for adjusting the length of said acceleration stroke further includes additional spacer means intermediate said barrel assembly and said end guard.

7. An exposive charge actuated apparatus for testing the hardness of a test specimen by exerting a predetermined impact force on a test specimen, the combination comprising:
(A) a barrel assembly having a muzzle end and a breech end;
(B) an end guard connected to the muzzle end of said barrel assembly and adapted to position said barrel assembly spaced apart from said test specimen;
(C) a firing chamber assembly connected to the breech end of said barrel assembly and having a recessed firing chamber therein adapted to receive an explosive cartridge;
(D) a breech block assembly adapted to be connected to said barrel assembly so as to close the breech end of said explosive cartridge in said firing chamber;
(E) a firing pin mechanism slidably mounted in said breech block assembly and adapted to explode said explosive cartridge in said firing chamber;
(F) a driving piston slidably disposed in said barrel assembly adjacent said firing chamber forming a seal for fluid pressure gases created by said explosive cartridge, said driving piston being adapted to be accelerated by the explosion of said explosive cartridge by said firing pin mechanism, said fluid pressure gases acting on said driving piston to provide an acceleration force for moving said driving piston over an adjustable acceleration stroke to develop a desired velocity indicative of a predetermined impact force;
(G) a driven piston including a piston rod connected to said driving piston for movement therewith, said driven piston being slidably guided in said barrel assembly by said driving piston and having a ball receiving end extending through said end guard to to a normal firing position beyond said barrel assembly;
(H) a Brinell hardness ball mounted on said ball receiving end of said driven piston and adapted to receive a predetermined impact force therefrom, said impact force being defined as the kinetic energy transferred from said driven piston to said Brinell ball at the end of said adjustable acceleration stroke of said driving piston;
(I) resilient means compressed between said end guard and said driving piston for yieldingly urging said driving piston, said driven piston and said Brinell ball to a normal firing position wherein said Brinell ball is spaced apart from said test specimen;
(J) gas port means in said barrel assembly at a point removed from said firing chamber assembly providing an outlet for said fluid pressure gases, said gas port means being uncovered by said driving piston during said acceleration stroke of said driving piston, said acceleration stroke being defined as the distance said driving piston moves to cause said test ball to contact said test specimen;
(K) and means for adjusting the length of said acceleration stroke of said driving piston so as to achieve a predetermined calibrated velocity indicative of a predetermined calibrated impact force at the end of said acceleration stroke, whereby said calibrated impact force is imparted by said driven piston to said Brinell ball and thus to said test specimen.

8. An explosive charge actuated apparatus for testing the hardness of a test specimen by exerting a predetermined impact force on a test specimen, the combination comprising:
(A) a barrel assembly having a muzzle end and a breech end;
(B) an end guard connected to the muzzle end of said barrel assembly;
(C) a firing chamber assembly connected to the breech end of said barrel assembly and having a recessed firing chamber therein adapted to receive an explosive cartridge;
(D) a breech block assembly adapted to be connected to said barrel assembly so as to close the breech end of said explosive cartridge in said firing chamber;
(E) a firing pin mechanism slidably mounted in said breech block assembly and adapted to explode said explosive cartridge in said firing chamber;
(F) a driving piston slidably disposed in said barrel assembly adjacent said firing chamber forming a seal for the fluid pressure gases created by said explosive cartridge, said driving piston being adapted to be accelerated by the explosion of said explosive cartridge by said firing pin mechanism, said fluid pressure gases acting on said driving piston providing a force for moving said driving piston over an adjustable acceleration stroke so as to provide a desired velocity indicative of a predetermined impact force;
(G) a driven piston disposed apart from said driving piston in said barrel assembly having a driven end adapted to be driven by said driving piston and a ball receiving end guided in said end guard and extending outward therefrom;
(H) a Brinell hardness ball mounted on said ball receiving end of said driven piston;
(I) spring means compressed between said driving piston and said driven piston for yieldingly positioning said driving piston to a normal firing position wherein said Brinell ball is contacting said test specimen;
(J) gas port means in said barrel assembly at a point removed from said firing chamber assembly providing an outlet for said fluid pressure gases, said gas port means being uncovered by said driving piston during said acceleration stroke of said driving piston, said acceleration stroke being defined as the distance said driving piston moves to contact said driven piston to exert an impact force thereon;
(K) and means for adjusting the length of said acceleration stroke of said driving piston so as to achieve a predetermined calibrated velocity indicative of a predetermined calibrated impact force at the end of said acceleration stroke, whereby said calibrated impact force is imparted to said driven piston by said driving piston and thus to said test specimen from said Brinell ball.

References Cited by the Examiner
UNITED STATES PATENTS

| | | |
|---|---|---|
| 7,706 | 10/50 | Ray. |
| 1,708,262 | 4/29 | Davis _____ 73—82 |
| 2,221,157 | 11/40 | Temple _____ 30—358 |
| 2,848,915 | 8/58 | Aitken et al. |
| 3,024,666 | 3/62 | Haskell et al. _____ 30—358 |

FOREIGN PATENTS 89,653 12/58 Holland.

RICHARD C. QUEISSER, *Primary Examiner.*
RICHARD QUEISSER, *Examiner.*